(12) United States Patent
Yang

(10) Patent No.: US 11,102,284 B2
(45) Date of Patent: Aug. 24, 2021

(54) SERVICE PROCESSING METHODS AND SYSTEMS BASED ON A CONSORTIUM BLOCKCHAIN NETWORK

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/162,830

(22) Filed: Jan. 29, 2021

(65) Prior Publication Data

US 2021/0160312 A1    May 27, 2021

Related U.S. Application Data

(63) Continuation of application No. PCT/CN2019/115983, filed on Nov. 6, 2019.

(30) Foreign Application Priority Data

Dec. 28, 2018  (CN) .......................... 201811621431.4

(51) Int. Cl.
*H04L 29/08*    (2006.01)

(52) U.S. Cl.
CPC ........ *H04L 67/1008* (2013.01); *H04L 67/101* (2013.01); *H04L 67/104* (2013.01); *H04L 67/32* (2013.01)

(58) Field of Classification Search
CPC ... H04L 67/104; H04L 9/0643; H04L 9/3093; H04L 67/1008; H04L 67/32; H04L 67/101
(Continued)

(56) References Cited

U.S. PATENT DOCUMENTS 6,182,139 B1    1/2001  Brendel
2005/0273456 A1  12/2005  Revanuru et al.
(Continued)

FOREIGN PATENT DOCUMENTS

CN    1512375    7/2004
CN    1984045    6/2007
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Glenford J Madamba
(74) *Attorney, Agent, or Firm* — Fish & Richardson P.C.

(57) ABSTRACT

Methods, systems and apparatus, including computer programs encoded on computer storage media, for consortium blockchain network-based service processing. In one example, the method includes generating, by a target client device associated with a target service node of a consortium blockchain network, a service-related transaction; sending, by the target client device, the service-related transaction to the target service node; determining that the service-related transaction has not been recorded in the consortium blockchain network by the target service node; identifying, by the target client device, one node identifier in a candidate list maintained at the target client device as a designated node identifier; and sending, by the target client device, the service-related transaction to a different service node in the consortium blockchain network that corresponds to the designated node identifier.

18 Claims, 7 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2018/0276626 | A1 | 9/2018 | Laiben | |
| 2019/0236598 | A1* | 8/2019 | Padmanabhan | .... G06Q 20/4016 |
| 2019/0370793 | A1* | 12/2019 | Zhu | ....................... H04L 9/3239 |
| 2019/0370806 | A1* | 12/2019 | Wang | ..................... H04L 9/3247 |
| 2020/0026862 | A1* | 1/2020 | Zhang | ..................... G06F 9/466 |

FOREIGN PATENT DOCUMENTS

| | | |
|---|---|---|
| CN | 102148850 | 8/2011 |
| CN | 105406980 | 3/2016 |
| CN | 105763386 | 7/2016 |
| CN | 106452871 | 2/2017 |
| CN | 106919476 | 7/2017 |
| CN | 106991573 | 7/2017 |
| CN | 107124460 | 9/2017 |
| CN | 107291546 | 10/2017 |
| CN | 107306278 | 10/2017 |
| CN | 108234212 | 6/2018 |
| CN | 108449401 | 8/2018 |
| CN | 108769242 | 11/2018 |
| CN | 110012054 | 7/2019 |
| WO | WO-2019003083 A1 * 1/2019 ............. G06Q 20/02 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/115983, dated Mar. 31, 2020, 9 pages (with partial English translation).

* cited by examiner

SERVICE PROCESSING METHODS AND SYSTEMS BASED ON A CONSORTIUM BLOCKCHAIN NETWORK

CROSS-REFERENCE TO RELATED APPLICATIONS

This application is a continuation of PCT Application No. PCT/CN2019/115983, filed on Nov. 6, 2019, which claims priority to Chinese Patent Application No. 201811621431.4, filed on Dec. 28, 2018, and each application is hereby incorporated by reference in its entirety.

TECHNICAL FIELD

The present disclosure relates to a field of information technology, and in particular to service processing methods and systems based on a consortium blockchain network.

BACKGROUND

Along with the development of blockchain technology, a service processing mode based on a consortium blockchain network becomes widespread. This service processing mode has an advantage that the problem of distrust of a client device of a service organization on the service organization is solved in a decentralized manner.

Specifically, a plurality of service organizations can form a consortium where the server or server cluster of each service organization can be actually regarded as one node in the consortium blockchain network. For any service organization, a node under the management of the service organization is responsible for recording a service-related transaction initiated by a client device of the service organization, and then broadcasts the service-related transaction to the entire network to allow each node to perform the service-related transaction respectively and write the service-related transaction into a blockchain for distributed storage.

However, in practice, for any service organization in the consortium, if a node device under the management of the service organization is down, the service-related transaction initiated by the client device of the service organization during the down period will not be recorded, that is, the consortium blockchain network cannot provide service for the client device of the service organization.

SUMMARY

In order to solve the problem that any node device in a consortium blockchain network is unable to provide service to a client device connected with the node device due to shutdown, the embodiments of the present specification provide service processing methods and apparatuses based on a consortium blockchain network in the following technical solutions.

According to a first aspect of an example of the present disclosure, there are provided service initiation methods based on a consortium blockchain network. The consortium blockchain network includes a plurality of service nodes. A target service node is a service node in cooperative relationship with at least one service node, a target client device is any client device for which the target service node is responsible, the target client device stores a candidate queue corresponding to the target service node and the candidate queue includes a node identifier of a service node in cooperative relationship with the target service node.

The service initiation methods include the following:
the target client device creates a service-related transaction and sends the service-related transaction to the target service node;
when it is determined that the target service node does not record the service-related transaction, one node identifier in the stored candidate queue is determined as a designated node identifier;
the service-related transaction is sent to a service node corresponding to the designated node identifier.

According to a second aspect of an example of the present disclosure, there are provided methods of determining a candidate queue in the service recording methods in the first aspect. The consortium blockchain network includes a plurality of service nodes and the target service node is a service node in cooperative relationship with at least one service node. The methods include the following:

for each service node in cooperative relationship with the target service node, the target service node determines a current performance characterization value corresponding to the service node; the current performance characterization value corresponding to the service node can be positively correlated with an amount of current load capacity of the service node and/or can be negatively correlated with an amount of current communication delay of the service node;

respective service nodes in cooperative relationship with the target service node are sorted in a descending order, based on the size of the current performance characterization value corresponding to each the service node in cooperative relationship with the target service node, so as to obtain the candidate queue corresponding to the target service node.

According to a third aspect of an example of the present disclosure, there are provided service recording methods based on a consortium blockchain network. Based on the service initiation method in the above first aspect, the service recording methods include the following:

the target service node receives a service-related transaction from the client device for which a cooperative service node is responsible, where the cooperative service node is any service node in cooperative relationship with the target service node;

the received service-related transaction is recorded immediately; or the received service-related transaction is recorded in delay; or the received service-related transaction is rejected.

According to a fourth aspect of an example of the present disclosure, there are provided service processing systems, including a consortium blockchain network formed of a plurality of service nodes and a plurality of client devices for which each service node is responsible, where a target service node is a service node in cooperative relationship with at least one service node, a target client device is any client device for which the target service node is responsible, the target client device stores a candidate queue corresponding to the target service node and the candidate queue includes a node identifier of a service node in cooperative relationship with the target service node.

The target client device creates a service-related transaction and sends the service-related transaction to the target service node. When it is determined that the target service node does not record the service-related transaction, one node identifier in the stored candidate queue is determined as a designated node identifier; and the service-related transaction is sent to the service node corresponding to the designated node identifier.

In the technical solution provided in some embodiments of the present specification, service nodes in the consortium blockchain network can establish a cooperative relationship with each other. For one group of service nodes in cooperative relationship, if the service-related transaction cannot be recorded due to shutdown of any one service node therein, the client device corresponding to such service node can send the service-related transaction to another service node in the same group for recordation.

Because a service-related transaction recorded by any one service node will be broadcast to the entire network to allow each service node to perform the service-related transaction respectively in the consortium blockchain network, data stored in different service nodes are naturally consistent. In other words, when one service node is down, another service node will record and broadcast, in place of the service node, the service initiated by the client device for which the service node is responsible, which means that the consortium blockchain network itself already has a disaster recovery capability and can provide services to the client devices of any one service organization in the consortium continuously (i.e. high availability of the services of the consortium blockchain network).

It is understood that the above general descriptions and subsequent detailed descriptions are merely illustrative and explanatory and will not constitute any limitation to the embodiments of the present specification.

Furthermore, any one example of the embodiments of the present specification does not need to achieve all above effects.

BRIEF DESCRIPTION OF THE DRAWINGS

In order to help understand the technical solutions in the embodiments of the present specification or in the existing technology, the accompanying drawings required for descriptions of some embodiments and the existing technology will be briefly described below. It is clear that the accompanying drawings described below are merely some examples of the embodiments of the present specification, and those skilled in the art can obtain other accompanying drawings based on these drawings.

DETAILED DESCRIPTION

It is noted that transaction described in the present disclosure refers to some data that a user creates through a client device of a blockchain and finally publishes to the blockchain. Transaction is a data structure agreed through consensus according to a blockchain protocol. When the data is to be stored in the blockchain, it will be packaged into a transaction.

Transactions in a blockchain include transactions in narrow sense and broad sense. The transaction in narrow sense refers to a value transfer published by a user to the blockchain. For example, in a traditional bitcoin blockchain network, a transaction can be a transfer initiated by a user in the blockchain. The transaction in broad sense refers to a piece of service data with service intent published by a user to the blockchain. For example, based on actual needs, an operator can establish a consortium blockchain on which some online services of other types irrelevant to value transfer are deployed (for example, house leasing, vehicle scheduling service, insurance claim service, credit service and medical service and the like). In such consortium blockchain, the transaction can be a service message or service request with service intent published by the user in the consortium blockchain.

Herein, the client device initiates a service, that is, initiates a transaction relating to the service (hereinafter called a service-related transaction).

Figure 1:
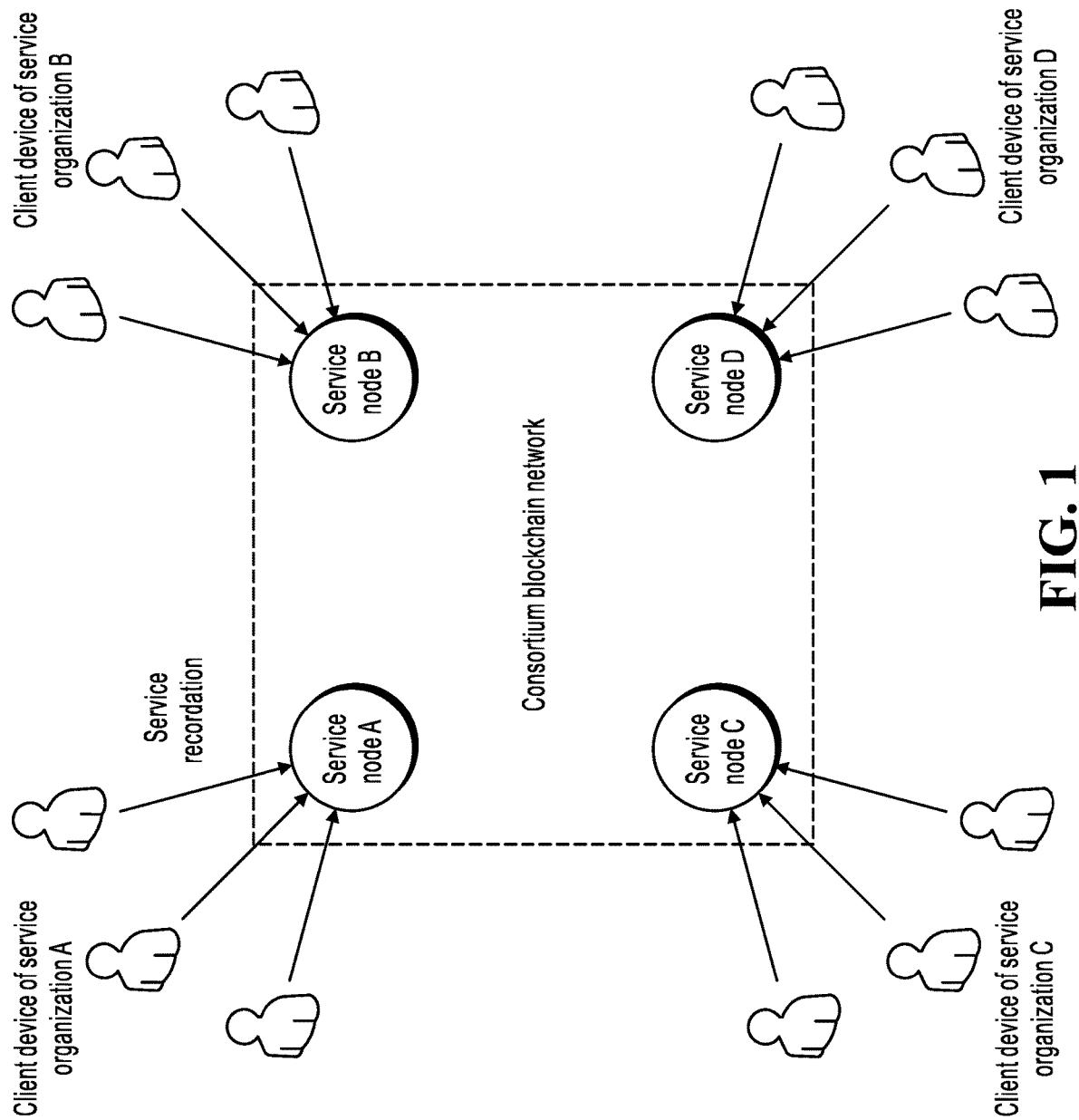
FIG. 1 is an architecture diagram of an example service processing mode based on a consortium blockchain network.

In the existing service processing mode based on a consortium blockchain network, each service organization in the consortium has its own client devices. For any one service organization, the service node under the management of the service organization is needed to record the service-related transaction initiated by the client device of the service organization. Furthermore, any service-related transaction initiated by a client device of any service organization will be finally delivered to each service node in the consortium blockchain network to perform distributed performance and storage. FIG. 1 is an architecture diagram of a service processing mode based on a consortium blockchain network.

In the existing technology, in order to enable any service node to record service-related transactions from client devices continuously (i.e. high availability of services), it is a common practice to perform disaster tolerance deployment for each service node.

Figure 2:
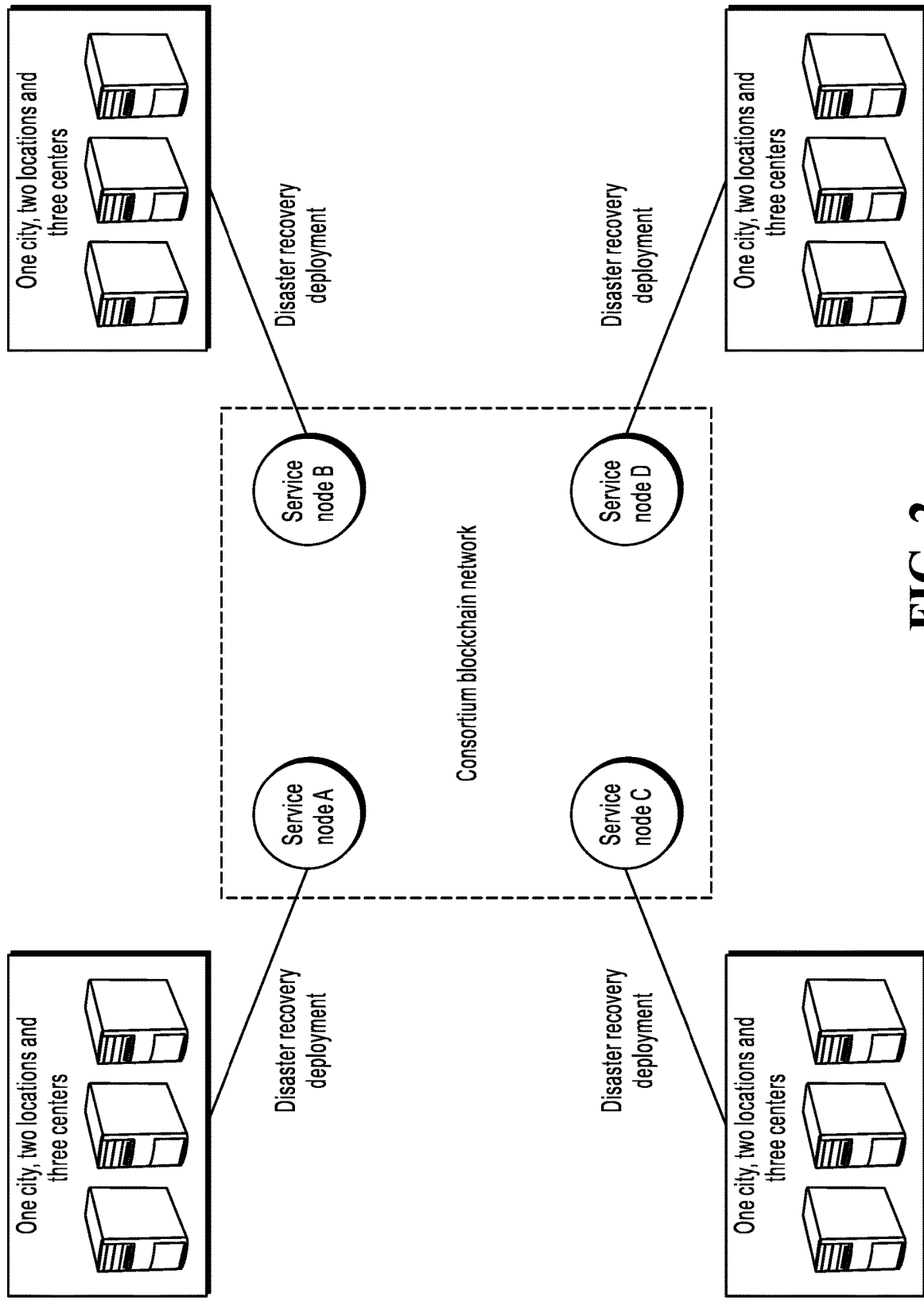
FIG. 2 is an architecture diagram of a consortium blockchain network with high availability of services in the existing technology.

FIG. 2 is an architecture diagram of a consortium blockchain network with high availability of services in the existing technology. As shown in FIG. 2, each service organization needs to perform disaster tolerance deployment for the service nodes under its management. For example, a service organization A can adopt a disaster tolerance deployment mode of "one city, two locations and three centers", that is, one primary machine house and an auxiliary machine house are deployed in the same city and another auxiliary machine house is deployed in a different city. Under normal circumstances, the primary machine house runs the service node A. When the primary machine house fails, the auxiliary machine house in the same city will continue to run the service node A; when the primary machine house and the auxiliary machine house in the same city both fail, the auxiliary machine house in the different city will continue to run the service node A. In this way, it is basically ensured that the service node A can continuously record the service-related transactions initiated by the client device of the service organization A, so that the services provided externally by the consortium blockchain network are highly available.

However, in the architecture shown in FIG. 2, each service organization needs to spend high technical costs in maintaining its three machine houses to keep the data consistency. Only in this way can the three machine houses of the service organization perform service switching in a case of need.

In the present disclosure, the high availability of services of the consortium blockchain network can be achieved with lower technical costs. Specifically, in the present disclosure, at least some service nodes in the consortium blockchain network do not need to perform disaster tolerance deployment, and at least one service node group can be divided from the service nodes without disaster tolerance deployment. The service node group includes at least two service nodes in cooperative relationship. For a group of service nodes in cooperative relationship, if any service node in the group is down, another service node in the same group can serve as a backup service node for replacing the failing service node to record the service-related transaction initiated by the client device connected with the failing service node.

Furthermore, due to the distributed mechanism of the blockchain architecture, different service nodes in the consortium blockchain network are naturally consistent in data and thus it is not required to perform data consistency deployment for such service nodes at technical costs.

For example, as shown in FIG. 1, the service node A can establish cooperative relationship with a service node B. In this way, the service node A and the service node B are disaster tolerance devices for each other. When the service node A is down, the client device of the service node A can initiate a service-related transaction to the service B which can record and broadcast the service-related transaction to the entire network for distributed processing. In this case, the client device of the service node A will not feel service interruption, and the consortium blockchain network has a disaster recovery capability due to a consensus mechanism among the service nodes (capable of tolerating a given number of failing nodes and/or malicious nodes). Thus, even if the service node A is down, the service nodes B-C still can write the service-related transaction into the blockchain based on the consensus mechanism.

In order to help the persons skilled in the art to better understand the technical solutions of the present disclosure, the technical solutions of the present disclosure will be detailed below in combination with the accompanying drawings of the embodiments of the present specification. Clearly, some embodiments described herein are merely some of embodiments of the present specification rather than all embodiments. All other examples obtained by those skilled in the art based on the embodiments of the present specification shall fall within the scope of protection of the present disclosure.

The technical solutions in the embodiments of the present specification will be detailed below in combination with accompanying drawings.

Figure 3:
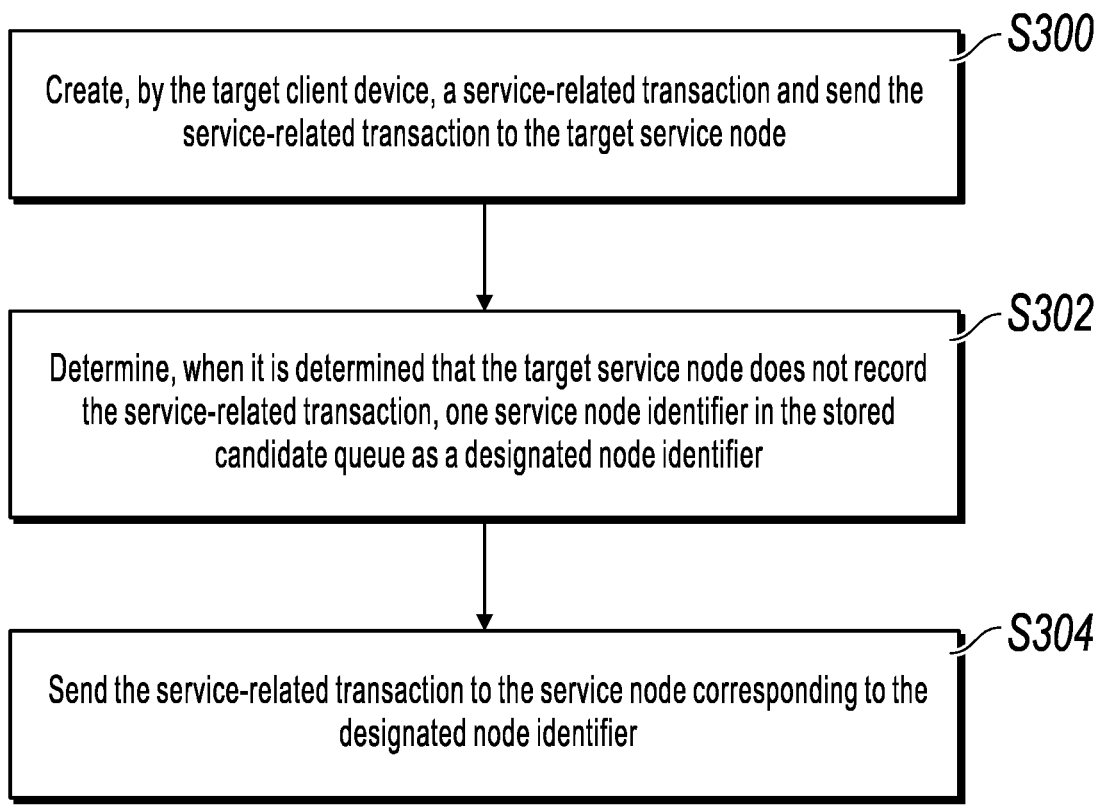
FIG. 3 is a flowchart of a service initiation method based on a consortium blockchain network according to some embodiments of the present specification.

FIG. 3 is a flowchart of a service initiation method based on a consortium blockchain network according to some embodiments of the present specification. The method includes the following steps.

S300, the target client device creates a service-related transaction and sends the service-related transaction to the target service node.

In the embodiments of the present specification, the consortium blockchain network includes a plurality of service nodes. Each service node can perform disaster tolerance deployment in the existing technology or does not perform disaster tolerance deployment. If the service node does not perform disaster tolerance deployment, it can establish cooperative relationship with other service nodes without disaster tolerance deployment. It is noted that there can be more than one service node group with cooperative relationship in the consortium blockchain network.

In the present disclosure, the target service node refers to a service node in cooperative relationship with at least one other service node. That is, for ease of descriptions, any one service node in any one service node group in the consortium blockchain network is referred to as a target node. Likewise, for ease of descriptions, any client device for which the target service node is responsible is referred to as a target client device and a service node in cooperative relationship with the target service node is referred to cooperative service node.

In the embodiments of the present specification, the target client device stores a candidate queue corresponding to the target service node. The candidate queue corresponding to the target service node includes anode identifier of a service node in cooperative relationship with the target service node.

This means that when the target service node is down, the target client device can select a service node from the stored candidate queue to continue initiating a service-related transaction and therefore the service will not be interrupted.

The sorting order of different service nodes in the candidate queue corresponding to the target service node can be designated as needed or in random.

Generally, the target service node distributes, in advance, a candidate queue corresponding to itself to each client device connected with itself for storage. If the target service node updates the candidate queue corresponding to itself subsequently, the target service node will distribute the updated candidate queue to each client device connected with itself, so that each client device deletes the candidate queue stored prior to the update and stores the updated candidate queue.

S302, when it is determined that the target service node does not record the service-related transaction, one service node identifier in the stored candidate queue is determined as a designated node identifier.

S304: the service-related transaction is sent to the service node corresponding to the designated node identifier.

In actual application, the target service node may fail to record the service-related transaction due to its shutdown, or for other reasons such as overload. It is noted that in the present disclosure, if the target client device does not receive a recordation result returned by the target service node after elapse of a designated time interval starting from initiating the service-related transaction to the target service node, the target client device determines that the target service node does not record the service-related transaction.

After determining the target service node does not record the service-related transaction, the target client device can select one node identifier as a designated node identifier from the stored candidate queue, for example, a first service node identifier, and then send the service-related transaction to the service node corresponding to the designated node identifier to request the service node to record the service-related transaction.

Figure 4:
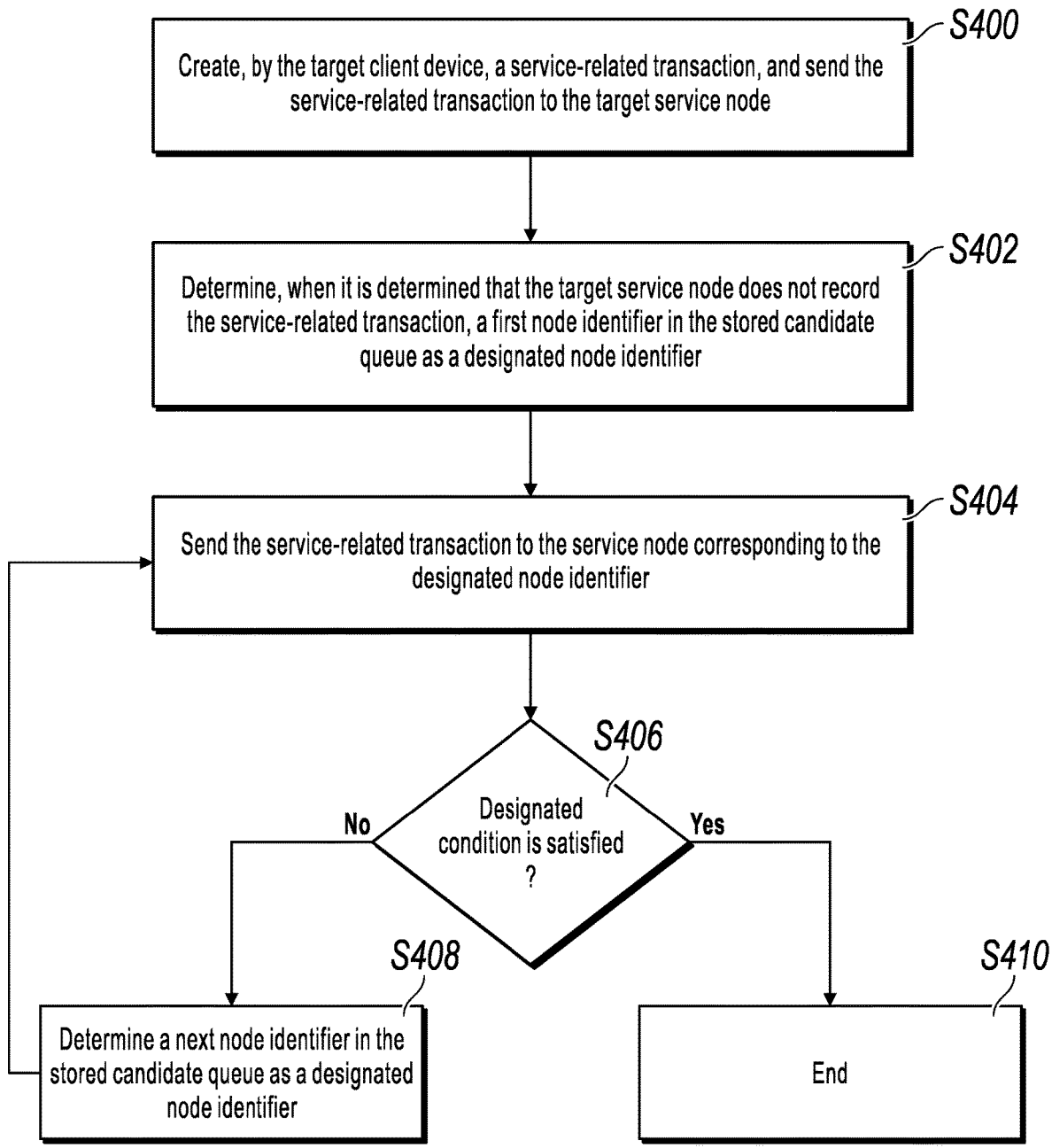
FIG. 4 is a flowchart of another service initiation method based on a consortium blockchain network according to some embodiments of the present specification.

FIG. 4 is a flowchart of another service initiation method based on a consortium blockchain network according to some embodiments of the present specification. The method includes the following steps.

S400, the target client device creates a service-related transaction, and sends the service-related transaction to the target service node.

S402, when it is determined that the target service node does not record the service-related transaction, a first node identifier in the stored candidate queue is determined as a designated node identifier.

S404, the service-related transaction is sent to the service node corresponding to the designated node identifier.

S406, it is determined whether a designated condition is satisfied. If no, step S408 is performed and if yes, step S410 is performed.

S408, a next node identifier in the stored candidate queue is determined as a designated node identifier, and step S404 is repeated.

S410, end.

After determining that the target service node does not record the service-related transaction, the target client device can perform service initiating to a service node corresponding to each node identifier, based on the sequence of different node identifiers in the stored candidate queue, corresponding to the target service node until the service-related transaction is recorded, or until the service node corresponding to the Nth node identifier in the stored candidate queue does not record the service-related transaction, where N∈(1, M+1), and M is a number of node identifiers in the stored candidate queue.

According to the service initiation method shown in FIG. 3 or 4, when one service node is down, another service node will record and broadcast, in place of the service node, the service initiated by the client device for which the service node is responsible, which means that the consortium blockchain network itself already has a disaster recovery capability and can provide services to the client devices of any one service organization in the consortium continuously (i.e. high availability of the services of the consortium blockchain network). Further, due to the disaster recovery capability of the consortium blockchain network, services can be continued as normal even if the service node is down.

Further, a method of determining a candidate queue is provided in the following steps.

Step 1, for each service node in cooperative relationship with the target service node, the target service node determines a current performance characterization value corresponding to the service node.

Wherein, the current performance characterization value corresponding to the service node is positively correlated with an amount of current load capacity of the service node and/or is negatively correlated with an amount of current communication delay of the service node. That is, the current performance evaluation of the service node is based on at least one of the amount of current load capacity and the amount of current communication delay. The more the current idle resource of the service node is, the stronger the amount of current load capacity is and the stronger the current performance is. The lower the communication delay of the service node currently connected with the target service node is, the stronger the current performance of the service node is.

Step 2, the target service node sorts respective service nodes in cooperative relationship with the target service node in a descending order based on the size of the current performance characterization value corresponding to each service nodes in cooperative relationship with the target service node, so as to obtain the candidate queue corresponding to the target service node.

In this way, the target service node ranks high those cooperative nodes with strong current performance and ranks low those cooperative nodes with weak current performance behind.

Further, because the performance of each cooperative service node corresponding to the target service node usually dynamically changes, the candidate queue corresponding to the target service node can also be updated accordingly. Specifically, for each service node in cooperative relationship with the target service node, the target service node can re-determine the current performance characterization value corresponding to the service node whenever a designated period elapses, and then update the candidate queue corresponding to the target service node based on the current performance characterization value of each service node in cooperative relationship with the target service node.

Specifically, the target service node re-sorts respective service nodes in cooperative relationship with the target service node in a descending order based on the size of the current performance characterization value corresponding to each service nodes in cooperative relationship with the target service node, so as to obtain the updated candidate queue corresponding to the target service node.

In practice, the service nodes in the same service node group can send their own heart beat information to each other regularly. The heart beat information sent by each service node can specifically include idle resource information, communication delay information, transaction recording amount of unit time, and transaction broadcasting amount of unit time and the like of the service node.

Further, the embodiments of the present specification provide the following three manners of updating a candidate queue.

Manner 1:

Whenever the designated period elapses, the target service node can determine a first current relationship characterization value corresponding to each service node in cooperative relationship with the target service node.

Wherein the first current relationship characterization value corresponding to the service node is used to characterize a frequency that the service node records the service-related transactions sent by the target client. The higher frequency that the service node records the service-related transactions sent by the target client device indicates the larger first current relationship characterization value corresponding to the service node.

Subsequently, for each service node in cooperative relationship with the target service node, the target service node can determine a first current comprehensive characterization value corresponding to the service node based on the current performance characterization value corresponding to the service node and the first current relationship characterization value corresponding to the service node. The first current comprehensive characterization value corresponding to the service node is positively correlated with the current performance characterization value corresponding to the service node and negatively correlated with the first current relationship characterization value corresponding to the service node.

Finally, target service node can re-sort respective service nodes in cooperative relationship with the target service node in a descending order based on the first current comprehensive characterization value corresponding to each service node in cooperative relationship with the target service node, so as to obtain the updated candidate queue corresponding to the target service node.

In the first manner, when updating the candidate queue corresponding to the target service node, the target service node usually ranks lower those cooperative service nodes giving more assistance to the target service node, and ranks higher those cooperative service nodes giving less assistance to the target service node. Thus, when the target service node is down, the target client device will firstly continue sending the service-related transaction to the service node with a higher rank.

Manner 2

Whenever the designated period elapses, a second current relationship characterization value corresponding to each service node in cooperative relationship with the target service node is determined.

Wherein the second current relationship characterization value corresponding to the service node is used to characterize a frequency that the target service node records the service-related transactions sent by the client device corresponding to the service node. The higher frequency that the target service node records the service-related transactions sent by the client device corresponding to the service node indicates the larger second current relationship characterization value corresponding to the service node.

Then, for each service node in cooperative relationship with the target service node, the target service node can determine a second current comprehensive characterization value corresponding to the service node based on the current performance characterization value corresponding to the service node and the second current relationship characterization value corresponding to the service node. The second current comprehensive characterization value corresponding to the service node is positively correlated with the current performance characterization value corresponding to the service node and positively correlated with the second current relationship characterization value corresponding to the service node.

Finally, the target service node can re-sort respective service nodes in cooperative relationship with the target service node in a descending order based on the second current comprehensive characterization value corresponding to each service nodes in cooperative relationship with the target service node, so as to obtain the updated candidate queue corresponding to the target service node.

In the second manner, when updating the candidate queue corresponding to the target service node, the target service node usually ranks higher those cooperative service nodes giving more assistance to the target service node, and ranks lower those cooperative service nodes giving less assistance to the target service node. Thus, when the target service node is down, the target client device will firstly continue sending the service-related transaction to the service node with a higher rank.

Manner 3

Whenever the designated period elapses, the first current relationship characterization value and the second current relationship characterization value corresponding to each service node in cooperative relationship with the target service node are determined.

Then, a third current comprehensive characterization value corresponding to each service node in cooperative relationship with the target service node is determined based on the current performance characterization value corresponding to the service node, the first current relationship characterization value corresponding to the service node and the second current relationship characterization value corresponding to the service node. The third current comprehensive characterization value corresponding to the service node is positively correlated with the current performance characterization value corresponding to the service node, negatively correlated with the first current relationship characterization value corresponding to the service node, and positively correlated with the second current relationship characterization value corresponding to the service node.

Finally, the target service node can re-sort respective service nodes in cooperative relationship with the target service node in a descending order based on the third current comprehensive characterization value corresponding to each service node in cooperative relationship with the target service node, so as to obtain the updated candidate queue corresponding to the target service node.

However, in the embodiments of the present specification, there are other strategies for updating the candidate queue. For example, if the service nodes in the same service node group provide paid assistance to each other, updating the candidate queue cannot be subjected to the constraint of the above first current relationship characterization value and/or second current relationship characterization value.

Figure 5:
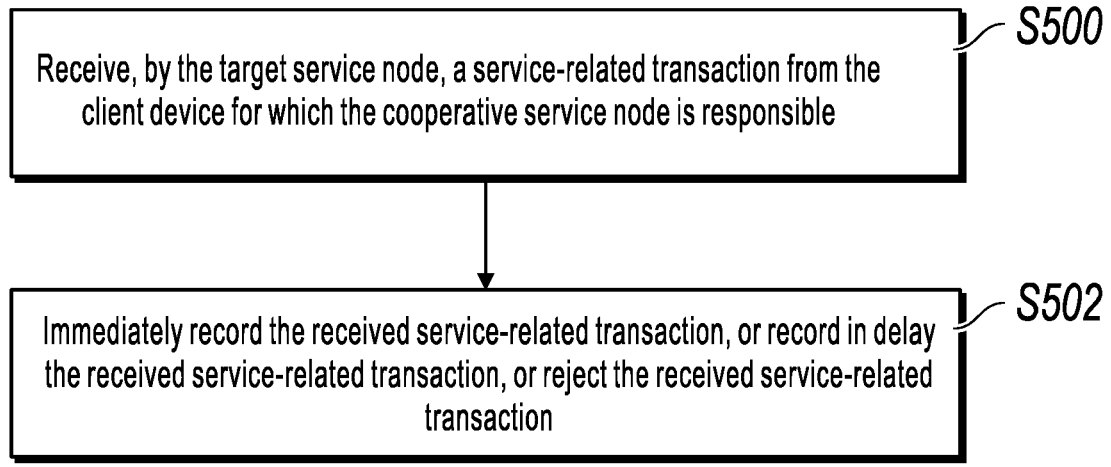
FIG. 5 is a flowchart of a service recording method based on a consortium blockchain network according to some embodiments of the present specification.

FIG. 5 is a flowchart of a service recording method based on a consortium blockchain network according to the embodiments of the present specification. The method includes the following steps.

S500, the target service node receives a service-related transaction from the client device for which the cooperative service node is responsible.

S502, the received service-related transaction is immediately recorded, or recorded in delay, or rejected.

In an actual application, the cooperative service node of the target service node can record the service-related transaction from the target client device, which is already described above. Further, the target service node can also receive the service-related transaction from the client device for which its cooperative service node is responsible. The following descriptions will be made from the view point that the target service node records the service-related transaction by replacing its cooperative service node.

When a cooperative service node of the target service node is down, the client device connected with the cooperative service node may send the service-related transaction to the target service node. The target service node can have its own transaction recordation strategy, to select immediate recordation or delayed recordation or rejection of the service-related transaction based on its own transaction recordation strategy.

The transaction recordation strategy can be configured according to actual needs. For example, the target service node can randomly determine immediate recordation, delayed recordation or rejection.

Further, the following transaction recordation strategies are illustratively provided in the embodiments of the present specification.

Strategy 1: if a resource consumption amount for recording the service-related transaction from the client device connected with the cooperative service node is not greater than a first threshold in a designated historical period, the received service-related transaction will be immediately recorded. If the resource consumption amount for recording the service-related transaction from the client device connected with the cooperative service node is greater than the first threshold in the designated historical period, delayed recordation or rejection will be performed.

Strategy 2: if the resource consumption amount for recording the service-related transaction from the client device connected with the cooperative service node is greater than the first threshold and smaller than a second threshold in the designated historical period, the received service-related transaction will be recorded in delay. If the resource consumption amount for recording the service-related transaction from the client device connected with the cooperative service node is not greater than the first threshold and not smaller than the second threshold in a designated historical period, the received service-related transaction will be recorded immediately or rejected.

Strategy 3: if the resource consumption amount for recording the service-related transaction from the client device connected with the cooperative service node is not smaller than the second threshold in the designated historical period, the received service-related transaction will be rejected. If the resource consumption amount for recording the service-related transaction from the client device connected with the cooperative service node is smaller than the second threshold in the designated historical period, the received service-related transaction will be recorded immediately or in delay.

Strategy 4: if the resource consumption amount for recording the service-related transaction from the client device connected with the cooperative service node is not greater than the first threshold in the designated historical period, the received service-related transaction will be recorded immediately. If the resource consumption amount for recording the service-related transaction from the client device connected with the cooperative service node is greater than the first threshold and smaller than the second threshold in the designated historical period, the received service-related transaction will be recorded in delay, where the first threshold is smaller than the second threshold. If the resource consumption amount for recording the service-related transaction from the client device connected with the cooperative service node is not smaller than the second threshold in the designated historical period, the received service-related transaction will be rejected.

It is noted that in the present disclosure, the first threshold is smaller than the second threshold.

Figure 6:
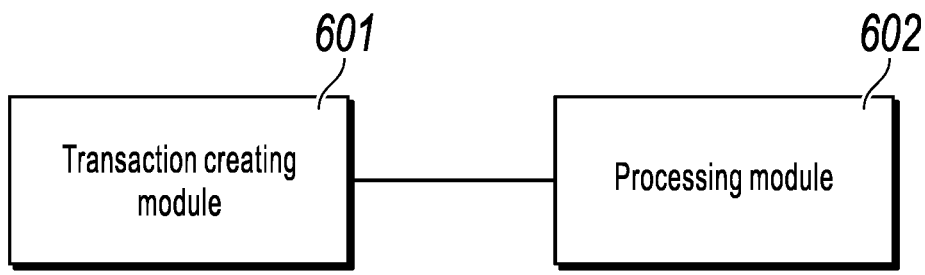
FIG. 6 is a structural schematic diagram of a user operation apparatus according to some embodiments of the present specification.

FIG. 6 is a structural schematic diagram of a user operation apparatus according to some embodiments of the present specification. The consortium blockchain network includes a plurality of service nodes. The target service node is a service node in cooperative relationship with at least one service node. The user operation apparatus is connected with the target service node, the user operation apparatus stores a candidate queue corresponding to the target service node, and the candidate queue corresponding to the target service node includes a node identifier of a service node in cooperative relationship with the target service node.

The user operation apparatus includes:

a transaction creating module 601, configured to create a service-related transaction and send the service-related transaction to the target service node;

a processing module 602, configured to determine one node identifier in the stored candidate queue as a designated node identifier, when determining the target service node does not record the service-related transaction; and send the service-related transaction to the service node corresponding to the node identifier.

The processing module 602 determines a first node identifier in the stored candidate queue as the designated node identifier; and performs the following steps cyclically until a designated condition is satisfied:

the service-related transaction is sent to the service node corresponding to the designated node identifier;

if the designated condition is not satisfied, a next node identifier in the stored candidate queue is determined as the designated node identifier;

the designated condition refers to that the service-related transaction is recorded, or the service node corresponding to the Nth node identifier in the stored candidate queue does not record the service-related transaction; $N \in (1, M+1)$, M is a number of node identifiers in the stored candidate queue.

Figure 7:
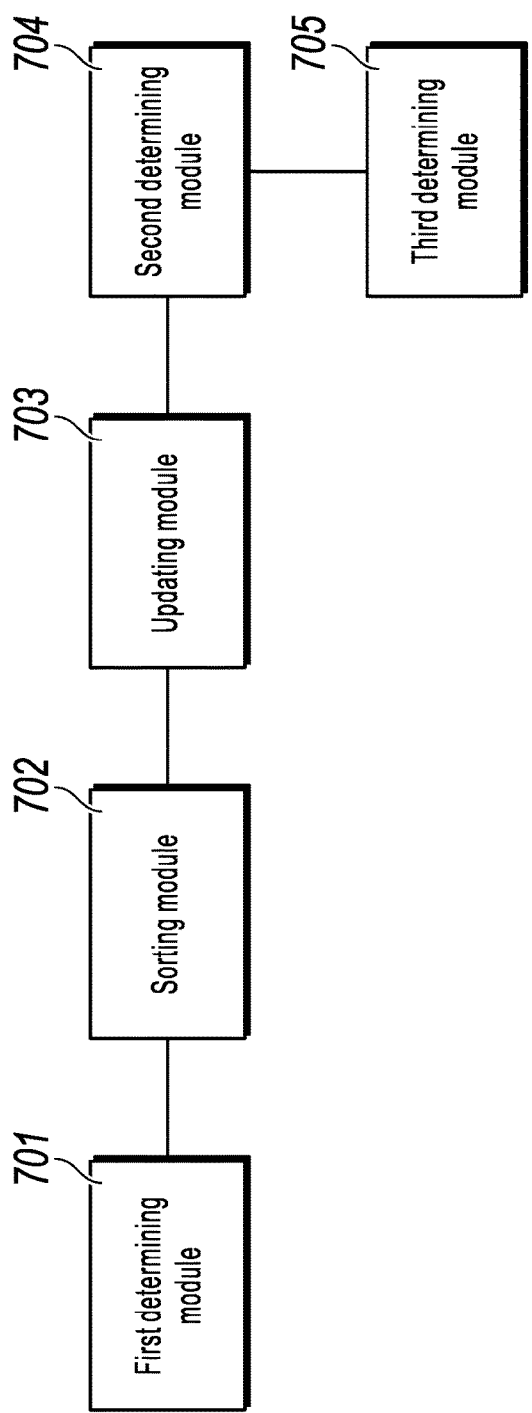
FIG. 7 is a structural schematic diagram of a service apparatus according to some embodiments of the present specification.

FIG. 7 is a structural schematic diagram of a service apparatus according to some embodiments of the present specification. The consortium blockchain network includes a plurality of service nodes. The service apparatus is a service node in cooperative relationship with at least one service node. The service apparatus includes:

a first determining module 701, configured to determine a current performance characterization value corresponding to each service node in cooperative relationship with the service apparatus; where the current performance characterization value corresponding to the service node is positively correlated with an amount of current load capacity of the service node, and/or negatively correlated with an amount of communication delay of the service node; and a sorting module 702, configured to sort respective service nodes in cooperative relationship with the target service node in a descending order based on the size of the current performance characterization value corresponding to each service node in cooperative relationship with the service apparatus, so as to obtain the candidate queue corresponding to the service apparatus.

The apparatus further includes:

an updating module 703, configured to: re-determine the current performance characterization value corresponding to each service node in cooperative relationship with the target service node whenever the designated period elapses; and update the candidate queue corresponding to the target service node based on the current performance characterization values corresponding to service nodes in cooperative relationship with the target service node.

The updating module 703 re-sort the respective service nodes in cooperative relationship with the target service node in a descending order based on the size of the current performance characterization value corresponding to each service node, so as to obtain the updated candidate queue corresponding to the target service node.

The target client device is any client device for which the service apparatus is responsible.

The apparatus further includes:

a second determining module 704, configured to determine a first current relationship characterization value corresponding to each service node in cooperative relationship with the target service node whenever the designated period elapses; where the first current relationship characterization value corresponding to the service node is used to characterize a frequency that the service node records the service-related transactions sent by the target client device, and the higher frequency that the service node records the service-related transactions sent by the target client device indicates the larger first current relationship characterization value corresponding to the service node.

The updating module 703 is configured to: determine a first current comprehensive characterization value corresponding to each service node in cooperative relationship with the target service node based on the current performance characterization value corresponding to the service node and the first current relationship characterization value corresponding to the service node, where the first current comprehensive characterization value corresponding to the service node is positively correlated with the current performance characterization value corresponding to the service node and negatively correlated with the first current relationship characterization value corresponding to the service node; and re-sort the respective service nodes in cooperative relationship with the target service node in a descending order based on the size of the first current comprehensive characterization value corresponding to each service node in cooperative relationship with the target service node, so as to obtain the updated candidate queue corresponding to the target service node.

The apparatus further includes:

a third determining module 705, configured to determine a second current relationship characterization value corresponding to each service node in cooperative relationship with the target service node whenever the designated period elapses, where the second current relationship characterization value corresponding to the service node is used to characterize a frequency that the target service node records the service-related transactions sent by the target client device corresponding to the service node, and the higher frequency that the target service node records the service-related transactions sent by the target client device corresponding to the service node indicates the larger second current relationship characterization value corresponding to the service node.

The updating module 703 is configured to determine a second current comprehensive characterization value corresponding to each service node in cooperative relationship with the target service node based on the current performance characterization value corresponding to the service node and the second current relationship characterization value corresponding to the service node, where the second current comprehensive characterization value corresponding to the service node is positively correlated with the current performance characterization value corresponding to the service node and positively correlated with the second current relationship characterization value corresponding to the service node; and re-sort the respective service nodes in cooperative relationship with the target service node in a descending order based on the size of the second current comprehensive characterization value corresponding to each the service node in cooperative relationship with the target service node, so as to obtain the updated candidate queue corresponding to the target service node.

Figure 8:
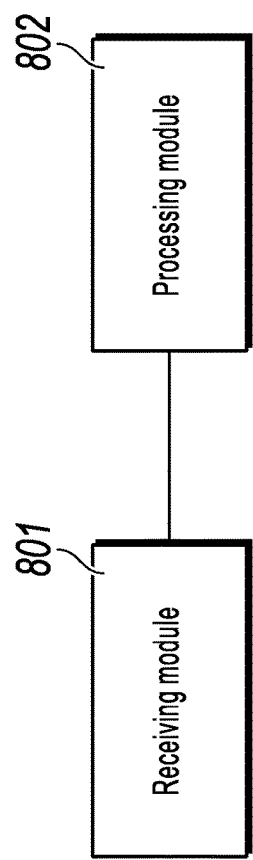
FIG. 8 is a structural schematic diagram of a service apparatus according to some embodiments of the present specification.

Based on the service initiation method shown in FIG. 3 or 4, FIG. 8 shows a structural schematic diagram of a service apparatus based on some embodiments of the present specification. The service apparatus includes:

a receiving module 801 configured to receive a service-related transaction from a client device for which a cooperative service node is responsible, where the cooperative service node is any service node in cooperative relationship with the target service node;

a processing module 802, configured to immediately record the received service-related transaction, or record, in delay, the received service-related transaction, or reject the received service-related transaction.

The processing module 802, when the resource consumption amount for recording the service-related transaction from the client device connected with the cooperative service node is not greater than the first threshold in the designated historical period, immediately records the received service-related transaction.

The processing module 802, when the resource consumption amount for recording the service-related transaction from the client device connected with the cooperative service node is greater than the first threshold and smaller than the second threshold in the designated historical period, in delay the received service-related transaction; where the first threshold is smaller than the second threshold.

The processing module 802, when the resource consumption amount for recording the service-related transaction from the client device connected with the cooperative service node is not smaller than the second threshold in the designated historical period, rejects the received service-related transaction.

Further, the embodiments of the present specification provide a service processing system, including a consortium blockchain network formed of a plurality of service nodes and a plurality of client devices for which each service node is responsible. A target service node is a service node in cooperative relationship with at least one service node, a target client device is any client device for which the target service node is responsible, the target client device stores a candidate queue corresponding to the target service node and the candidate queue includes a node identifier of a service node in cooperative relationship with the target service node.

The target client device creates a service-related transaction and sends the service-related transaction to the target service node. When it is determined that the target service node does not record the service-related transaction, one node identifier in the stored candidate queue is determined as a designated node identifier; and the service-related transaction is sent to the service node corresponding to the designated node identifier.

The target client device determines a first node identifier in the stored candidate queue as the designated node identifier; and performs the following steps cyclically until a designated condition is satisfied:

the service-related transaction is sent to the service node corresponding to the designated node identifier;

if the designated condition is not satisfied, a next node identifier in the stored candidate queue is determined as the designated node identifier;

the designated condition refers to that the service-related transaction is recorded, or the service node corresponding to the Nth node identifier in the stored candidate queue does not record the service-related transaction; N∈(1, M+1), M is a number of node identifiers in the stored candidate queue.

The target service node determines a current performance characterization value corresponding to each service node in cooperative relationship with the target service node, where the current performance characterization value corresponding to the service node is positively correlated with the amount of current load capacity of the service node and/or negatively correlated with the amount of current communication delay of the service node. The target service node sorts the respective service nodes in cooperative relationship with the target service node in a descending order based on the size of the current performance characterization value corresponding to each the service node in cooperative relationship with the target service node, so as to obtain the candidate queue corresponding to the target service node.

The target service node receives a service-related transaction from a client device for which the cooperative service node is responsible where the cooperative service node is any service node in cooperative relationship with the target service node; the target service node immediately records the received service-related transaction or records, in delay, the received service-related transaction, or rejects the received service-related transaction.

The embodiments of the present specification further provide a computer device, including at least a memory, a processor, and computer programs stored on the memory and operable on the processor. The processor executes the programs to implement the functions of the method of FIGS. 3-5.

Figure 9:
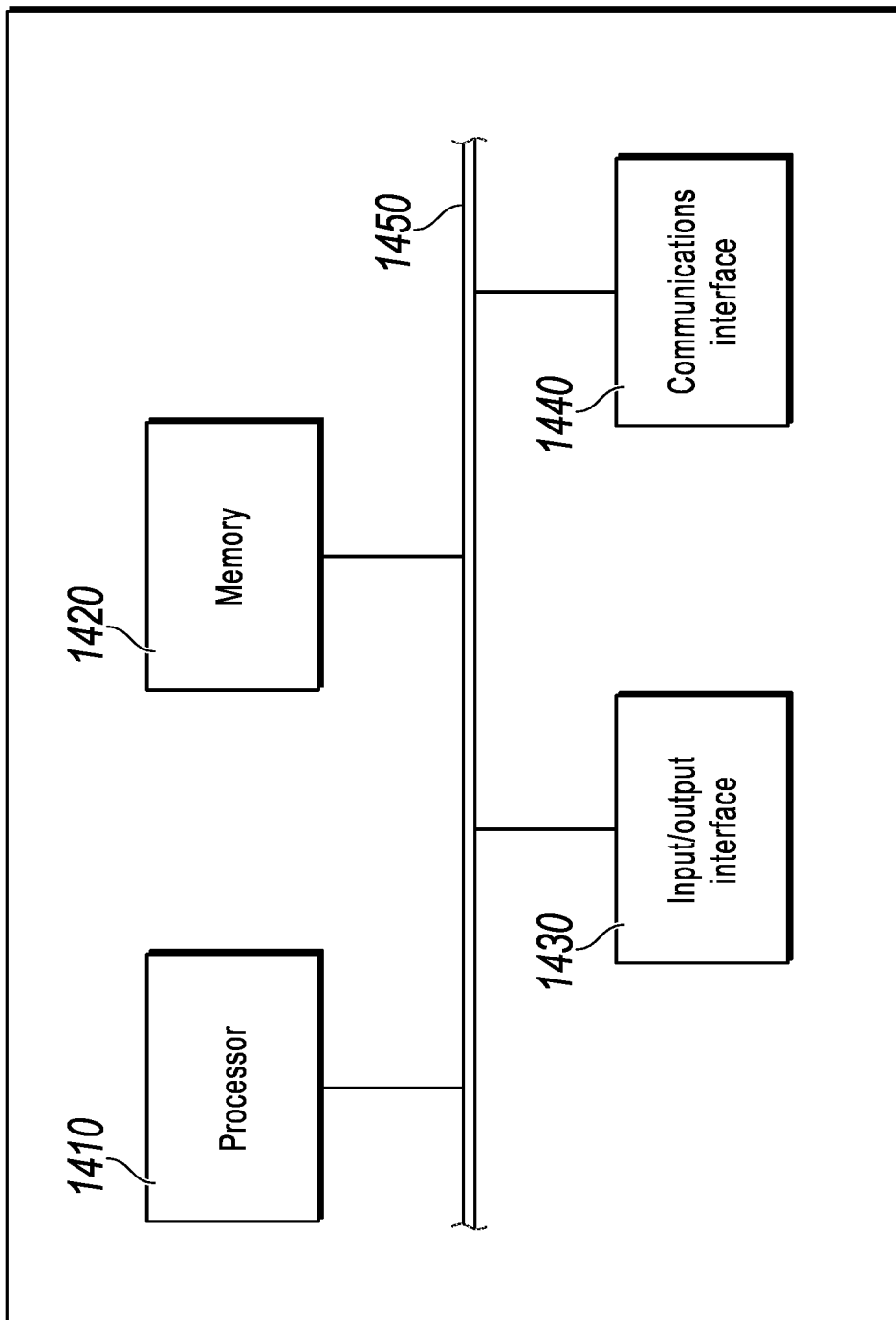
FIG. 9 is a structural schematic diagram of a computer device for configuring an example apparatus according to some embodiments of the present specification.

FIG. 9 is a structural schematic diagram of a more specific computer device hardware according to some embodiments of the present specification. The device can include a processor 1410, a memory 1420, an input/output interface 1430, a communication interface 1440 and a bus 1450. The processor 1410, the memory 1420, the input/output interface 1430, and the communication interface 1440 communicate with each other via bus 1450 in the device.

The processor 1410 can be implemented by a general Central Processing Unit (CPU), a microprocessor, an Application Specific Integrated Circuit (ASIC), one or more integrated circuits or the like to execute relevant programs to implement the technical solutions in the embodiments of the present specification.

The memory 1420 can be implemented by Read Only Memory (ROM), Random Access Memory (RAM), static storage device, dynamic storage device and the like. The memory 1420 can store operating system or other application programs. When the technical solutions of the present disclosure are implemented by software or firmware, the relevant program codes are stored in the memory 1420 and invoked by the processor 1410.

The input/output interface 1430 is used to connect with an input/output module to realize information input and output. The input/output module may be configured as an assembly in the device (not shown), or externally connected with the device to provide corresponding functions. The input device can include keyboard, mouse, touch screen, microphone, various sensors and so on, and the output device can include display, loudspeaker, vibrator and indicator lamp and so on.

The communication interface 1440 is used to connect with the communication module (not shown) to realize communication interaction between the present device and other devices. The communication module can realize communication in a wired manner such as USB or network cable, or in a wireless manner such as mobile network, WIFI and Bluetooth.

The bus 1450 includes a passage which transmits information among various assemblies of the device such as the processor 1410, the memory 1420, the input/output interface 1420 and the communication interface 1440.

It is noted that although the above device only illustrates the processor 1410, the memory 1420, the input/output interface 1420, the communication interface 1440 and the bus 1450, the device can also include other assemblies necessary for normal running. Further, it is appreciated for those skilled in the art that the above device can merely include the assemblies necessary for realizing the technical solution of the embodiments of the present specification without including all assemblies in drawings.

The embodiments of the present specification further provide a computer readable storage medium storing computer programs which are executed by the processor to implement the functions of the methods of FIGS. 3-5.

The computer readable storage medium includes permanent and non-permanent, mobile and non-mobile media which may realize information storage by any method or technology. The information may be computer readable instructions, data structure, programmed modules or other data. Some embodiments of the computer storage medium include but not limited to phase change random access memory (PRAM), static random access memory (SRAM), dynamic random access memory (DRAM), and other types of random access memories (RAM), Read only memory (ROM), Electrically Erasable Programmable Read-Only Memory (EEPROM), a Flash Memory, or other memory technology, CD-ROM, digital versatile disc (DVD) or other optical storage, cassette type magnetic tape, magnetic disk storage or other magnetic storage device or other non-transmission medium for storing information accessible by computing devices. As defined in the present disclosure, the computer readable storage medium does not include transitory media, such as modulated data signal or carrier.

As known from the above descriptions of some embodiments, persons skilled in the art may clearly know that the embodiments of the present specification may be implemented by software plus necessary general hardware platform. Based on such understanding, the technical scheme of the present disclosure essentially or a part contributing to the existing technology can be embodied in the form of a software product, the software product is stored in a storage medium such as ROM/RAM, magnetic disk and compact disk, and includes several instructions for enabling a computer device (such as a personal computer, a server or a network device) to execute all or part of the method disclosed by the embodiments of the present specification.

The system, method, module or unit described as above can be specifically implemented by a computer chip, or entity, or a product with a particular function. The specific form of the computer can be personal computer, laptop computer, cellular phone, camera phone, smart phone, personal digital assistant, media player, navigation device, e-mail transceiver, game console, tablet computer, wearable device or any several combinations of such devices.

The embodiments of the present specification are described progressively and reference may be made to each other for same or similar parts of various examples. Each example stresses the description of the differences from other examples. Since the apparatus embodiments substantially correspond to the method embodiments, a reference can be made to part of the descriptions of the method embodiments for the related part. The method embodiments described above are merely illustrative, where the modules described as separate members can be or not be physically separated. During implementation of the technical solutions of the present disclosure, the functions of various modules can be implemented in one or more software and/or hardware or part or all modules are used to implement the purpose of the embodiments of the present specification according to actual needs. Those of ordinary skill in the art can understand and carry out them without creative work.

The foregoing descriptions are merely made to the specific embodiments of the present specification. It should be pointed out that several improvements or modifications made by those skilled in the art without departing from the principle of the embodiments of the present specification shall fall within the scope of protection of the present disclosure.

What is claimed is:

1. A computer-implemented method, comprising:
   generating, by a target client device associated with a target service node of a consortium blockchain network that comprises a plurality of service nodes, a service-related transaction;
   sending, by the target client device, the service-related transaction to the target service node;

determining that the service-related transaction has not been recorded in the consortium blockchain network by the target service node;

identifying, by the target client device, one node identifier in a candidate list maintained at the target client device as a designated node identifier, wherein the candidate list comprises a node identifier of each service node in cooperative relationship with the target service node; and sending, by the target client device, the service-related transaction to a different service node in the consortium blockchain network that corresponds to the designated node identifier, wherein sending the service-related transaction to the different service node comprises:

identifying a first node identifier in the candidate list as the designated node identifier;

determining that terminal conditions for sending the service-related transaction are not satisfied; and in response to determining that terminal conditions are not satisfied, identifying a next node identifier that is subsequent to the first node identifier in the candidate list as the designated node identifier, wherein the terminal conditions comprise at least one of:

terminate sending the service-related transaction if the service-related transaction is recorded, or terminate sending the service-related transaction if the service-related transaction is not recorded by the service node corresponding to Nth node identifier in the candidate list, where N∈(1, M+1), and M is a number of all node identifiers included in the candidate list.

2. The computer-implemented method of claim 1, further comprising:

determining, by the target service node, for each service node in the cooperative relationship with the target service node, a current performance characterization value corresponding to the service node, wherein the current performance characterization value corresponding to the service node is positively correlated with an amount of current load capacity of the service node.

3. The computer-implemented method of claim 2, wherein the current performance characterization value corresponding to the service node is negatively correlated with an amount of current communication delay of the service node.

4. The computer-implemented method of claim 2, further comprising:

sorting respective service nodes in the cooperative relationship with the target service node in descending order based on the current performance characterization value corresponding to each service node in the cooperative relationship with the target service node; and generating the candidate list that lists the respective service nodes in the descending order.

5. The computer-implemented method of claim 3, further comprising:

in response to determining that a predetermined time period has elapsed, re-determining, for each service node in the cooperative relationship with the target service node, the current performance characterization value corresponding to the service node; and updating the candidate list corresponding to the target service node based on the current performance characterization value corresponding to each service node in the cooperative relationship with the target service node.

6. The computer-implemented method of claim 4, wherein updating the candidate list corresponding to the target service node based on the current performance characterization value corresponding to each service node in the cooperative relationship with the target service node comprises:

re-sorting the respective service nodes in the cooperative relationship with the target service node in an updated descending order based on the current performance characterization value corresponding to each service node in the cooperative relationship with the target service node; and generating an updated candidate list that lists the respective service nodes in the updated descending order.

7. The computer-implemented method of claim 5, further comprising:

determining, for each service node in the cooperative relationship with the target service node, a first current relationship characterization value corresponding to the service node wherein the first current relationship characterization value corresponding to the service node is used to characterize a frequency that the service node records the service-related transactions sent by the target client device, wherein a higher frequency indicates a larger first current relationship characterization value corresponding to the service node.

8. The computer-implemented method of claim 7, wherein updating the candidate list corresponding to the target service node comprises:

determining, for each service node in the cooperative relationship with the target service node, a first current comprehensive characterization value corresponding to the service node based on the current performance characterization value corresponding to the service node and the first current relationship characterization value corresponding to the service node, wherein the first current comprehensive characterization value corresponding to the service node is positively correlated with the current performance characterization value corresponding to the service node.

9. The computer-implemented method of claim 8, wherein the first current comprehensive characterization value corresponding to the service node is negatively correlated with the first current relationship characterization value corresponding to the service node.

10. The computer-implemented method of claim 8, further comprising: determining, for each service node in the cooperative relationship with the target service node, a second current relationship characterization value corresponding to the service node, where the second current relationship characterization value corresponding to the service node is used to characterize a frequency that the target service node records the service-related transactions sent by the client device corresponding to the service node, wherein a higher frequency indicates a larger second current relationship characterization value corresponding to the service node.

11. The computer-implemented method of claim 1, further comprising:

receiving, by the target service node, a service-related transaction from the client device associated with the target service node; and performing one of:
immediately recording the service-related transaction in the consortium blockchain network; or
recording, after a predetermined delay, the service-related transaction in the consortium blockchain network; or
rejecting to record the service-related transaction in the consortium blockchain network.

12. The computer-implemented method of claim 11, wherein immediately recording the service-related transaction comprises:
determining that a resource consumption amount for recording the service-related transaction from the client device connected with each service node in the cooperative relationship with the target service node is less than or equal to a first threshold in a predetermined historical period.

13. The computer-implemented method of claim 12, wherein recording, after the predetermined delay, the service-related transaction comprises:
determining that the resource consumption amount for recording the service-related transaction from the client device connected with each service node in the cooperative relationship with the target service node is greater than the first threshold and less than a second threshold in the predetermined historical period, where the first threshold is smaller than the second threshold.

14. The computer-implemented method of claim 12, wherein rejecting to record the service-related transaction comprises:
determining that the resource consumption amount for recording the service-related transaction from the client device connected with each service node in the cooperative relationship with the target service node is not less than a second threshold in the predetermined historical period.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
generating, by a target client device associated with a target service node of a consortium blockchain network that comprises a plurality of service nodes, a service-related transaction;
sending, by the target client device, the service-related transaction to the target service node;
determining that the service-related transaction has not been recorded in the consortium blockchain network by the target service node;
identifying, by the target client device, one node identifier in a candidate list maintained at the target client device as a designated node identifier, wherein the candidate list comprises a node identifier of each service node in cooperative relationship with the target service node; and
sending, by the target client device, the service-related transaction to a different service node in the consortium blockchain network that corresponds to the designated node identifier, wherein sending the service-related transaction to the different service node comprises:
identifying a first node identifier in the candidate list as the designated node identifier;
determining that terminal conditions for sending the service-related transaction are not satisfied; and
in response to determining that terminal conditions are not satisfied, identifying a next node identifier that is subsequent to the first node identifier in the candidate list as the designated node identifier, wherein the terminal conditions comprise at least one of:
terminate sending the service-related transaction if the service-related transaction is recorded, or
terminate sending the service-related transaction if the service-related transaction is not recorded by the service node corresponding to Nth node identifier in the candidate list, where $N \in (1, M+1)$, and M is a number of all node identifiers included in the candidate list.

16. The computer-implemented system of claim 15, wherein the operations further comprise:
determining, by the target service node, for each service node in the cooperative relationship with the target service node, a current performance characterization value corresponding to the service node, wherein the current performance characterization value corresponding to the service node is positively correlated with an amount of current load capacity of the service node.

17. The computer-implemented system of claim 16, wherein the current performance characterization value corresponding to the service node is negatively correlated with an amount of current communication delay of the service node.

18. A non-transitory, computer-readable medium storing one or more instructions executable by a computer system to perform operations comprising:
generating, by a target client device associated with a target service node of a consortium blockchain network that comprises a plurality of service nodes, a service-related transaction;
sending, by the target client device, the service-related transaction to the target service node;
determining that the service-related transaction has not been recorded in the consortium blockchain network by the target service node;
identifying, by the target client device, one node identifier in a candidate list maintained at the target client device as a designated node identifier, wherein the candidate list comprises a node identifier of each service node in cooperative relationship with the target service node; and
sending, by the target client device, the service-related transaction to a different service node in the consortium blockchain network that corresponds to the designated node identifier, wherein sending the service-related transaction to the different service node comprises:
identifying a first node identifier in the candidate list as the designated node identifier;
determining that terminal conditions for sending the service-related transaction are not satisfied; and
in response to determining that terminal conditions are not satisfied, identifying a next node identifier that is subsequent to the first node identifier in the candidate list as the designated node identifier, wherein the terminal conditions comprise at least one of:
terminate sending the service-related transaction if the service-related transaction is recorded, or
terminate sending the service-related transaction if the service-related transaction is not recorded by the service node corresponding to Nth node identifier in the candidate list, where $N \in (1, M+1)$, and M is a number of all node identifiers included in the candidate list.

* * * * *